United States Patent

[11] 3,590,220

[72] Inventors Minoru Ishida
Yokohama;
Junichi Baba, Kobe; Toshihiro Shibataki,
Kobe, all of, Japan
[21] Appl. No. 671,018
[22] Filed Sept. 27, 1967
[45] Patented June 19, 1971
[73] Assignee Mitsubishi Denki Kabushiki Kaisha
Cheyoda-ku, Tokyo, Japan

[54] APPARATUS FOR DETERMINING THE AMOUNT OF A PRODUCT CONSUMED BETWEEN TWO TIME PERIODS
11 Claims, 25 Drawing Figs.

[52] U.S. Cl. .......... 235/61.9, 222/23
[51] Int. Cl. .......... B67d 5/06, G06k 1/12
[50] Field of Search .......... 235/61.9, 61.8, 61.6, 60, 58, 59; 222/71, 23; 194/5, 43, 77

[56] References Cited
UNITED STATES PATENTS
2,545,460 3/1951 Hall .......... 235/61.8 X

*Primary Examiner*—Maynard R. Wilbur
*Assistant Examiner*—Thomas J. Sloyan
*Attorneys*—Robert E. Burns and Emmanuel J. Lobato ABSTRACT: The disclosed device comprises a readout unit for reading out the last consumption of electric power recorded on each card, a register unit for registering the new consumption of power, a computer circuit for computing a difference between the output from the read unit and the registered amount, another computer circuit for computing a rate for that difference, and a display unit for displaying at least one of the outputs of both circuits. One card for each customer recorded with at least the last consumption of power is inserted into the device and is successively recorded with the new consumption of power registered by the register unit, the above-mentioned difference of power, the rate for the consumption differential, etc. by the operation of a recording and a feeding units involved. Also another record medium or a customer receipt can be simultaneously prepared. The recorded cards are supplied to a data processing apparatus.

APPARATUS FOR DETERMINING THE AMOUNT OF A PRODUCT CONSUMED BETWEEN TWO TIME PERIODS

This invention relates in general to settlement of rates and more particularly to a method of and a device for performing the operation of settling variable power, gas or water rates which operation involves the operation of inspecting integrating meters, issuing application or collecting rates and issuing receipts.

The operating of collecting rates for amounts of gas, water including electric power consumed by the individual customers are at presently performed as follows:

1. Each inspector normally making the round of his assigned block once per every month or every other month reads the indications on watt-hour meters, water meters or gas meters disposed on the respective customers within that block and calculates the consumed amounts of the quantity by subtracting a magnitude of indication lastly read on the associated meter from that now read on the same meter.

2. He calculates rates for the consumed amounts of the quantity thus calculated and in accordance with the type of customers such as whether the particular customer is a large user or small user and issues applications.

3. Each money collector makes the round of his assigned block to collect the rates from the customers within that block.

The above-mentioned operations (1), (2) and (3) require many inspectors and money collectors resulting in a laborious work. This means that the computation or calculation of rates is a fairly troublesome operation.

A general object of the invention is, accordingly, to minimize the labor required for performing the operation of settling rates for consumed amounts of a quantity.

An object of the invention is to provide a new and improved portable rate settling device for computing a rate for a consumed amount of a quantity through a simple operation performed by an inspector carrying the device with him immediately after he has inspected the particular integrating meter and by which device he may receive the rate, if possible, for the purpose of improving the efficiency of the operation of settling the rates through its semiautomation.

Another object of the invention is to provide a new and improved method of settling rates for consumed amounts of a quantity by which an inspector carrying with him a rate settling device of the type described in the preceding paragraph can compute a rate for a consumed amount of the quantity immediately after he has inspected the associated integrating meter and if possible he may simultaneously receive the rate thereby to increase the efficiency of the operation through its semiautomation.

Still another object of the invention is to provide a new and improved method of settling rates for consumed amounts of a quantity by which an inspector carrying with him a rate settling device of the type described in the preceding paragraph can compute a rate for a consumed amount of the quantity immediately after he has inspected the associated integrating meter and, if possible, he may simultaneously receive the rate thereby to increase the efficiency of the operation through its semiautomation as well as processing data before and after the rate is settled, by a data processing system.

Briefly the invention accomplishes the above cited objects by the provision of a method of settling rates for consumptions of a quantity comprising the steps of registering into a rate settling device a magnitude of indication on a meter for integrating a consumption of the quantity obtained at the new inspection of the meter, entering into the device a magnitude of indication on said integrating meter obtained at the last inspection of the meter to cause the device to compute a rate for a consumed amount of the quantity and operating the device to record the magnitude of indication now inspected and the result of said computation on a record medium.

A preferred of embodiment of the device as above-described may comprise a set of record media each having recorded thereon a magnitude of indication on a meter for integrating consumption of the quantity obtained at the last inspection of the meter, readout means for reading out the recorder informations from the record medium to provide an output, register means for registering into the device a magnitude of indication on the meter obtained at the new inspection of the meter, first computer circuit means operatively connected to both the readout means and register means to compute a difference between the output from said readout means and the magnitude of indication registered by the register means to provide a consumed amount of the quantity, and second computer circuit means responsive to the consumed amount of the quantity applied thereto by said first computer circuit means to compute the corresponding rate, display means operatively connected to at least one of the first and second computer circuit means to display the output from that circuit means operatively connected thereto.

The invention will become more apparent from the following detailed description taken in conjunction with the accompanying drawings, in which.

Figure 2:
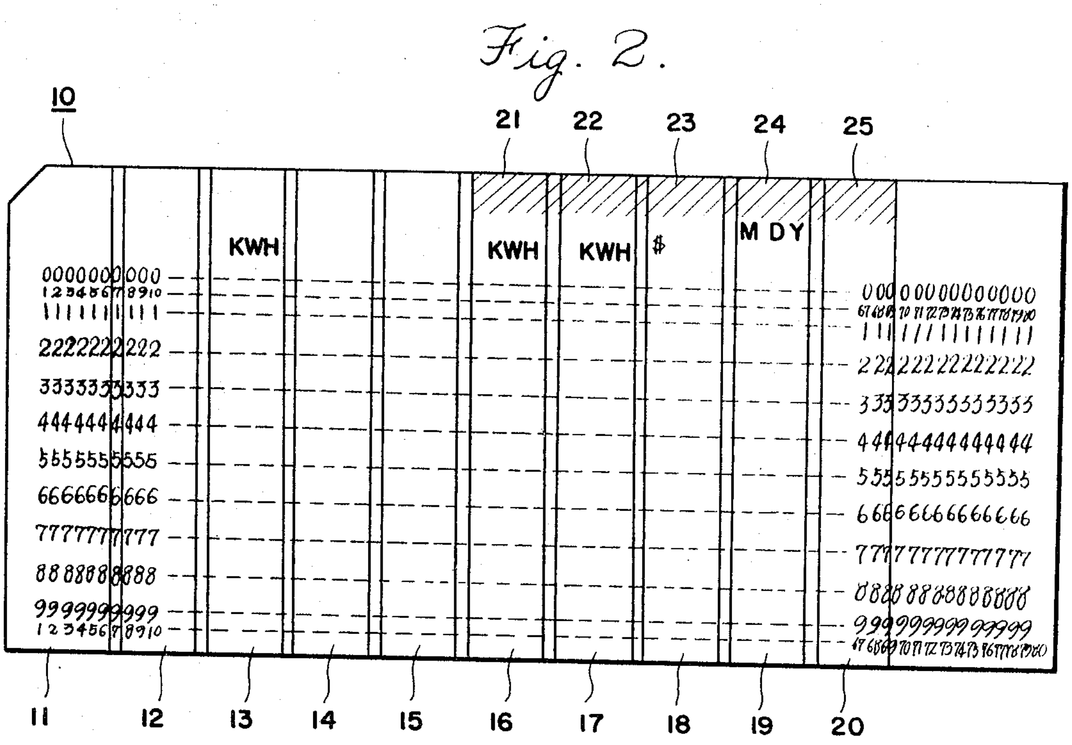
FIG. 2 is a view similar to FIG. 1 but illustrating those areas of the card in which various data are prescribed to be recorded.
Figures 3, 5:
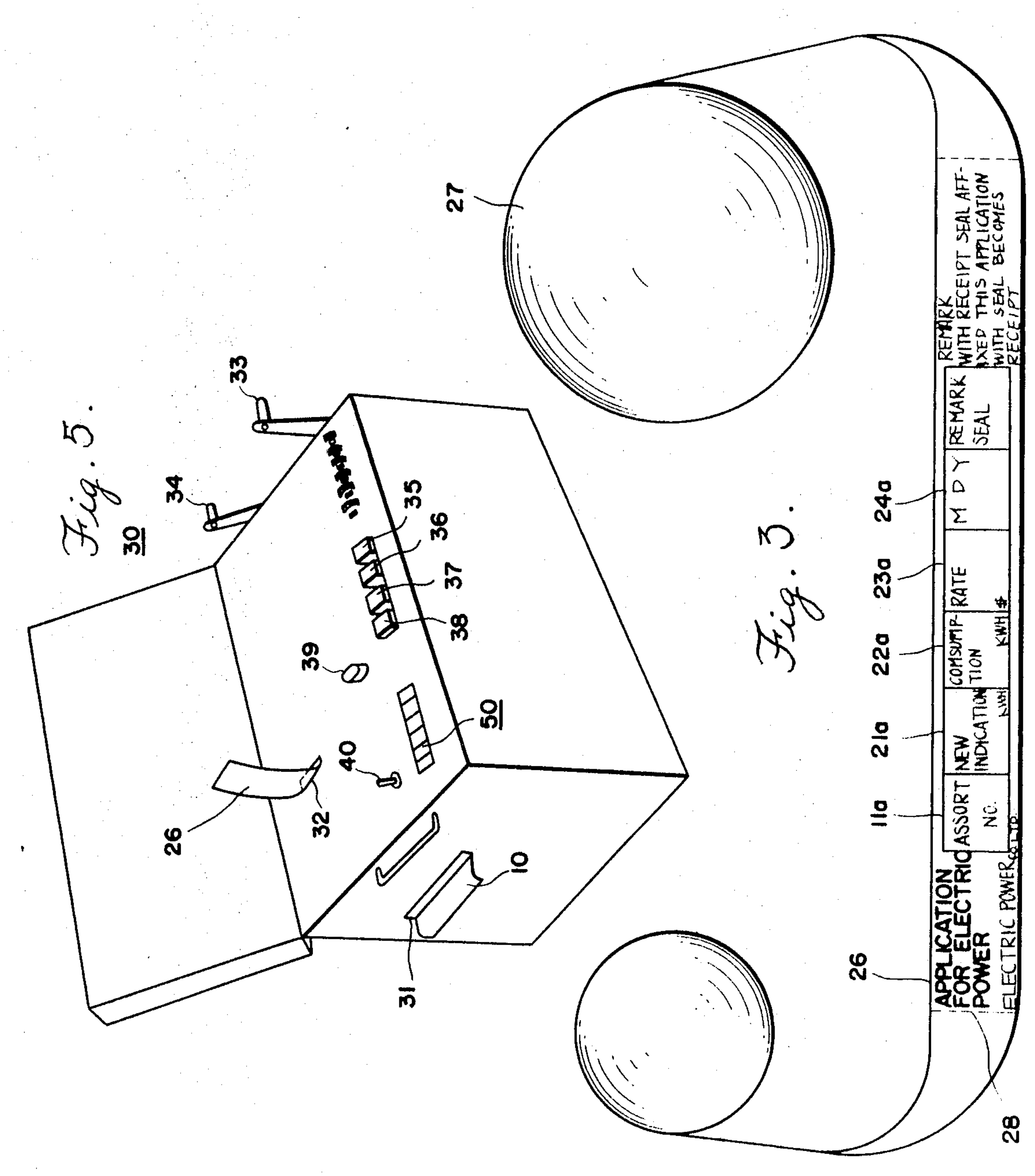
FIG. 3 is a schematic view of an application suitable for use with the invention applied to the distribution of electric power.
Figure 4A:
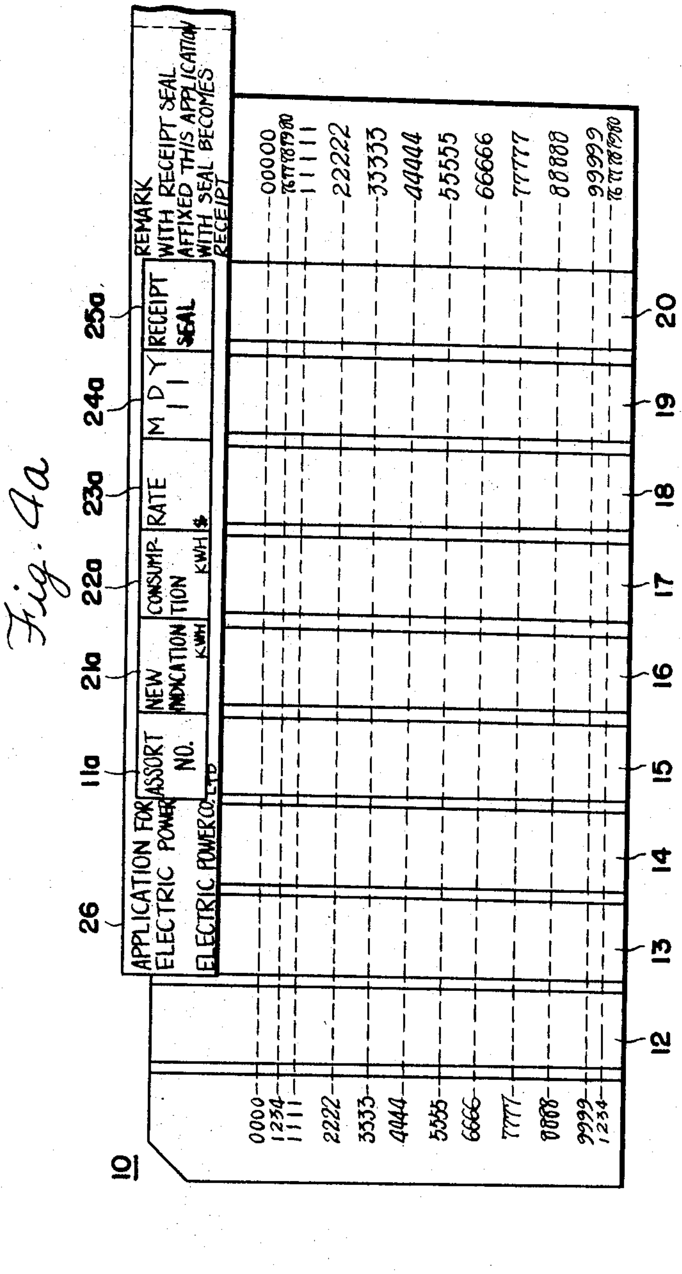
Figure 4B:
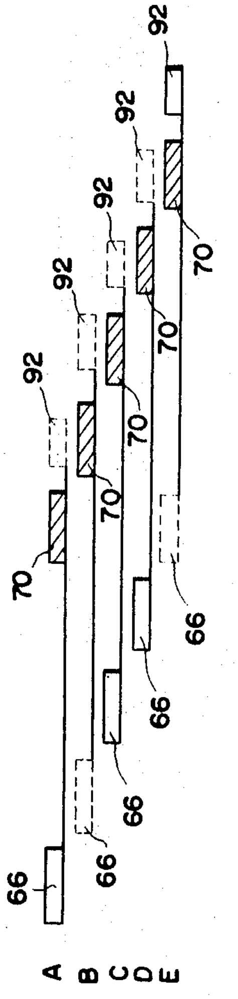
Figure 6:
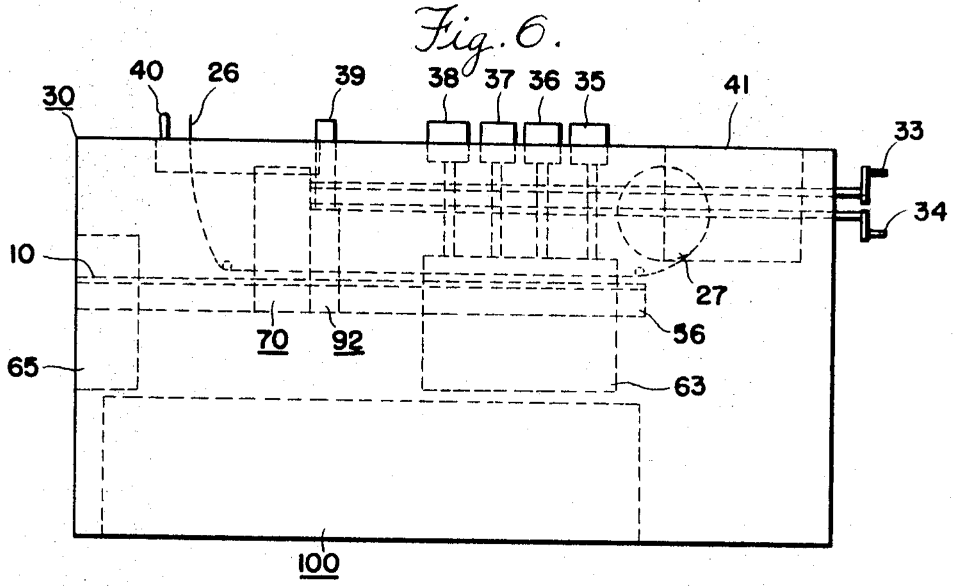
Figure 7:
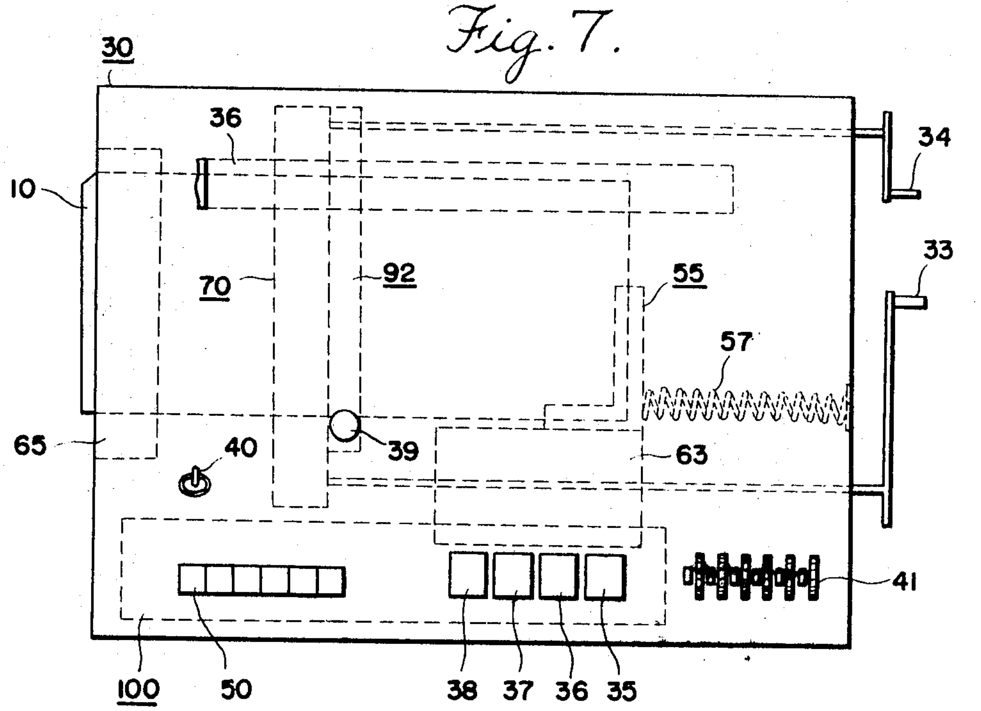
Figure 8A:
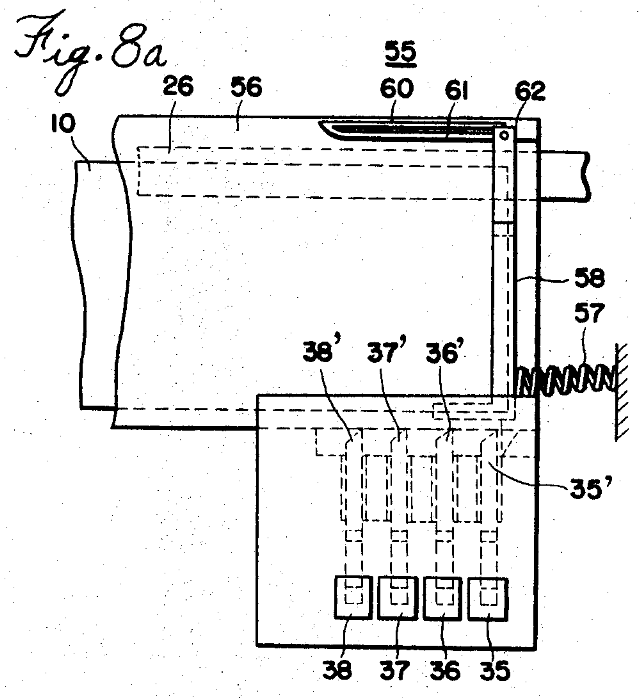
Figure 9A:
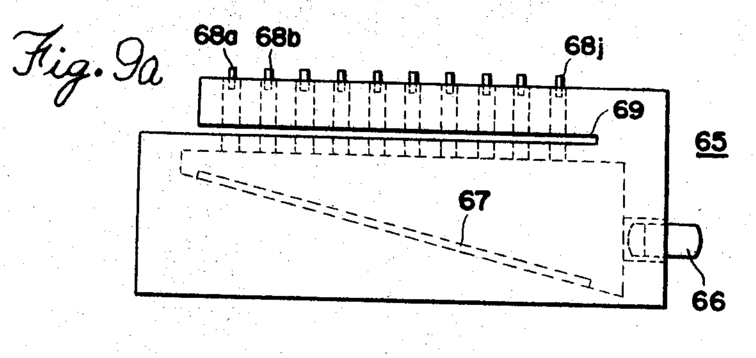
Figure 10A:
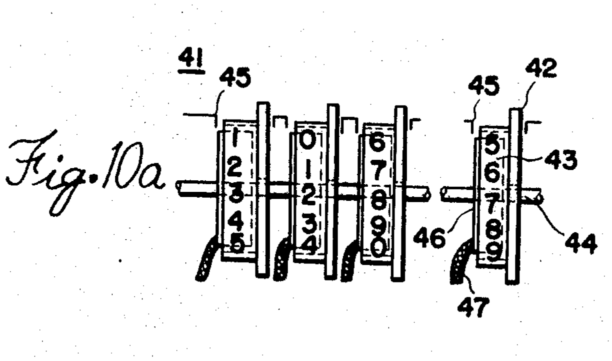
Figure 11A:
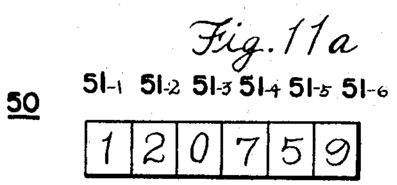
Figures 11B, 12A:
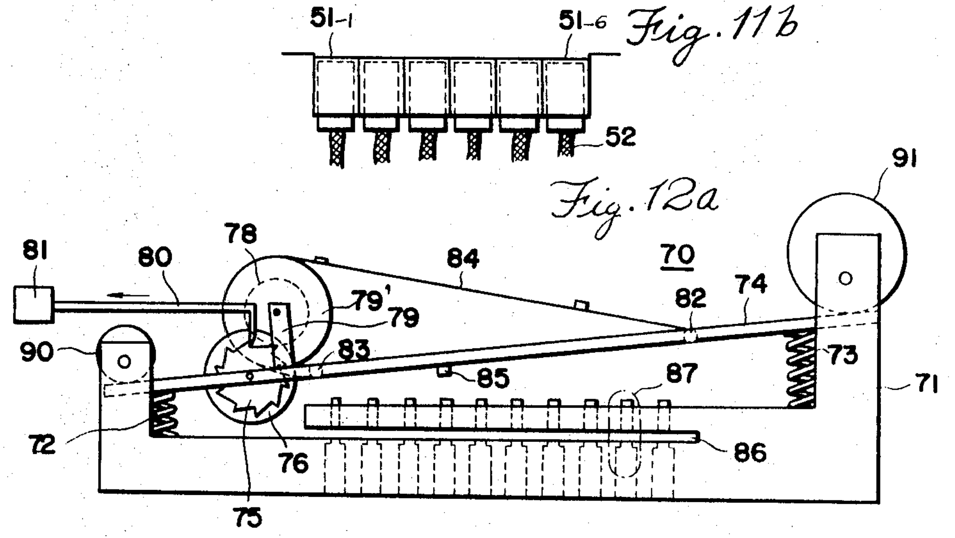
Figure 12B:
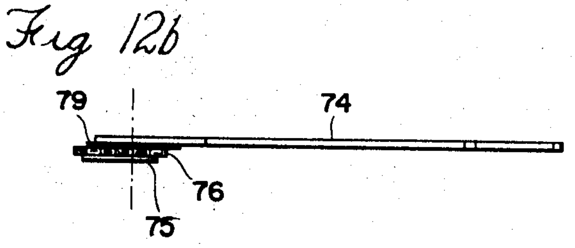
Figure 13:
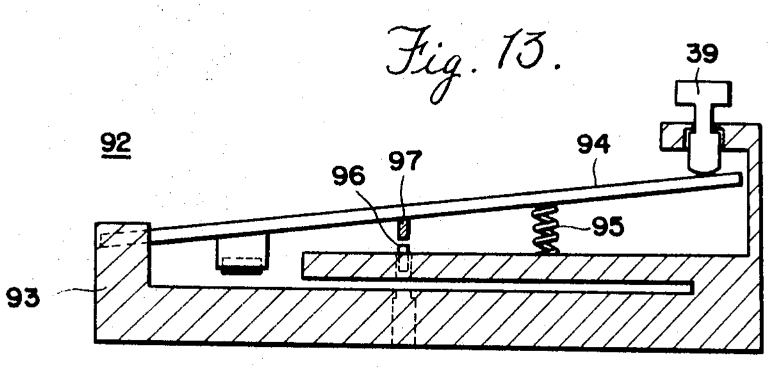
Figure 14:
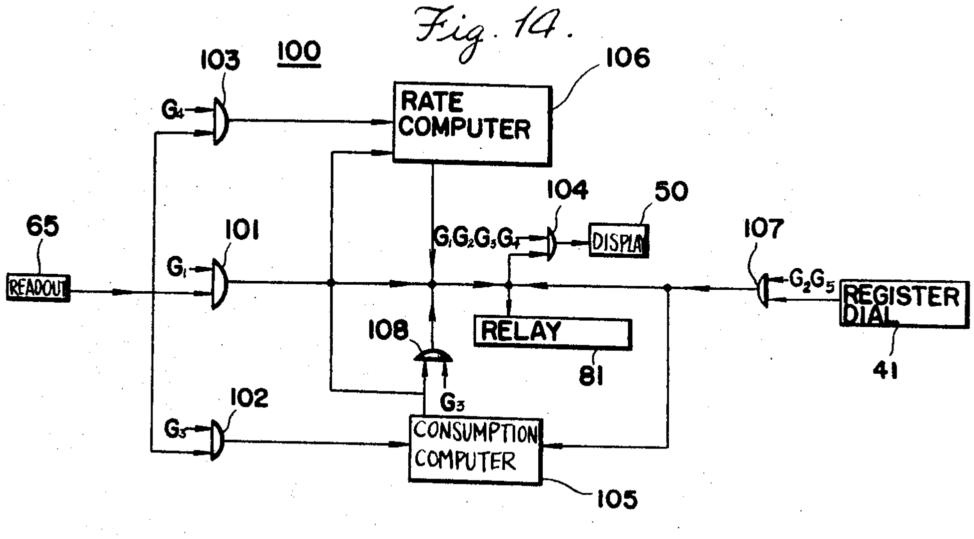
Figure 15:
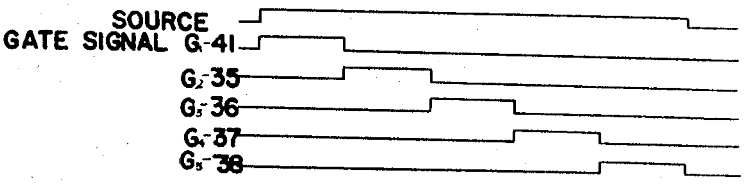
Figure 16:
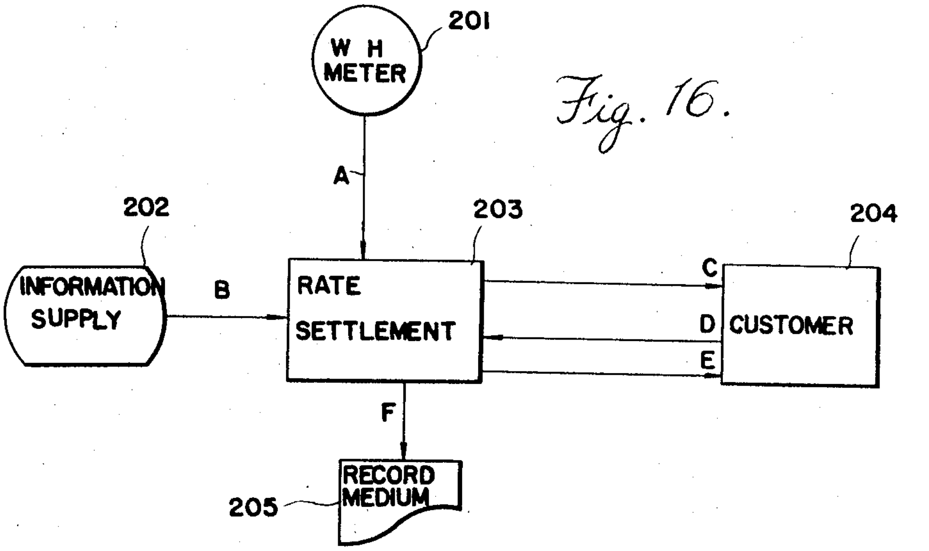
Figures 17, 18:
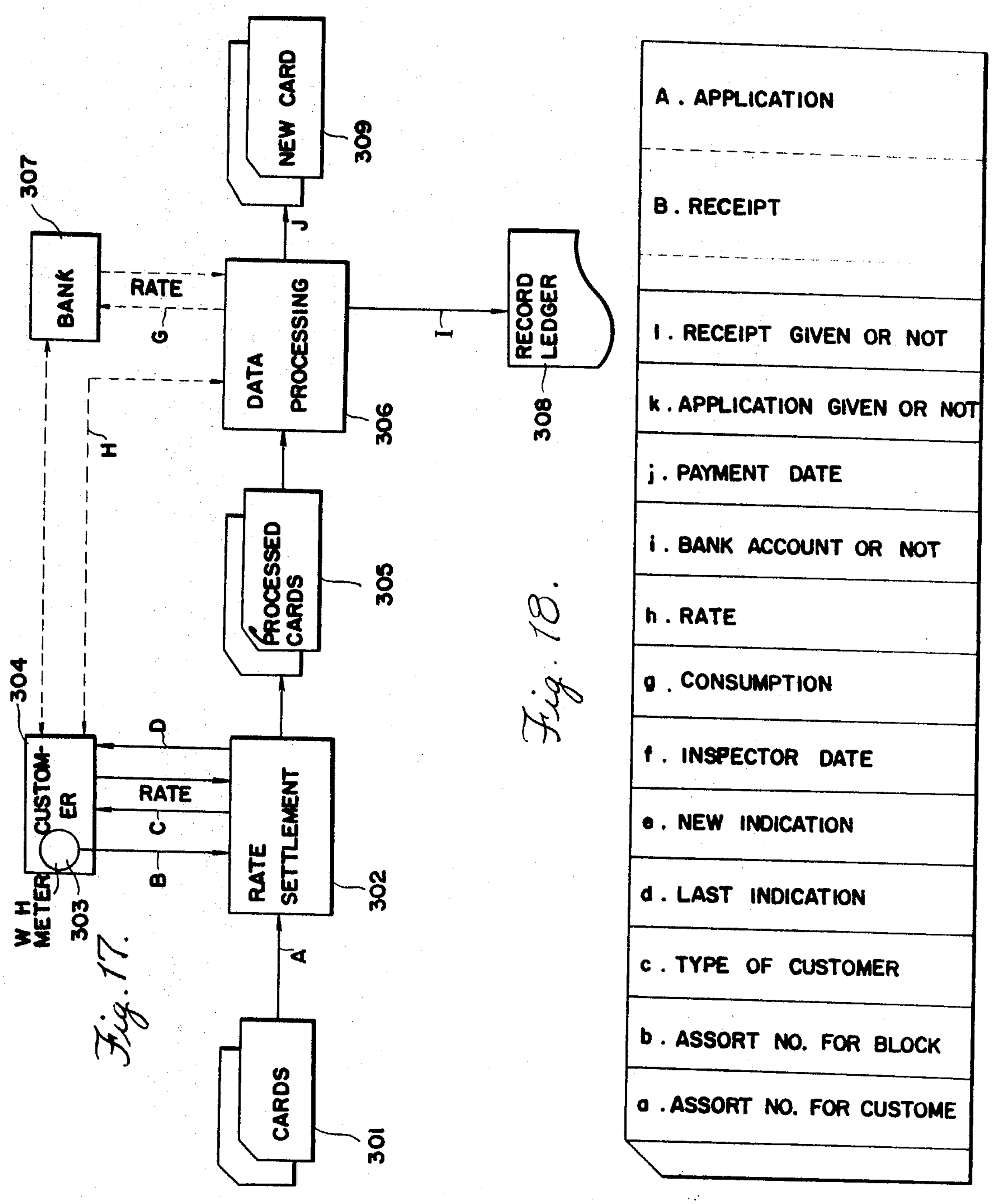

FIG. 4*a* is a diagrammatic view illustrating a relative position of the rate settling card of FIG. 2 to the application of FIG. 3;

FIG. 4*b* is a diagrammatic view useful in explaining the operation of the invention;

FIG. 5 is a perspective view of a rate settling device constructed in accordance with the invention with its cover maintained open;

FIG. 6 is a front elevational view of the device illustrated in FIG. 5 with certain parts illustrated at phantom line;

FIG. 7 is a top plan view of the device illustrated in FIGS. 5 and 6 with certain parts illustrated at phantom line, FIGS. 8*a* and *b* are respectively schematic plan and sectional views of a card carrying and feeding unit constructed in accordance with the invention;

FIGS. 9*a* and *b* are schematic views of a card readout unit suitable for use with the invention;

FIGS. 10*a* and *b* are respectively side elevational and plan views of a registering dial unit suitable for use with the invention;

FIGS. 11*a* and *b* are respectively a front and a side elevational view of a digital display unit suitable for use with the invention with parts omitted;

FIG. 12*a* is a diagrammatic side elevational view of a printing and punching unit constructed in accordance with the invention;

FIGS. 12*b* and *c* are view illustrating portions of the unit shown in FIG. 12*a*;

FIG. 13 is a side elevational view, partly in section of a printing unit for printing a seal for receipt according to the invention;

FIG. 14 is a schematic diagram of a computer circuitry constructed in accordance with the invention;

FIG. 15 is a graph illustrating waveforms appearing at the various points of the circuit illustrated in FIG. 14;

FIG. 16 is a block diagram of a system for settling rates arranged in accordance with the invention;

FIG. 17 is a block diagram of a modification of FIG. 16; and

FIG. 18 is a plan view of a rate settling card suitable for use with the system illustrated in FIG. 17.

Throughout several FIGURES the like reference numerals designate the corresponding or similar components.

While the invention has a wide variety of applications where rates or charges have to be settled on the spot the same will now be described in terms of the operation of settling rates for electric power only for the purpose of illustration.

Figure 1:
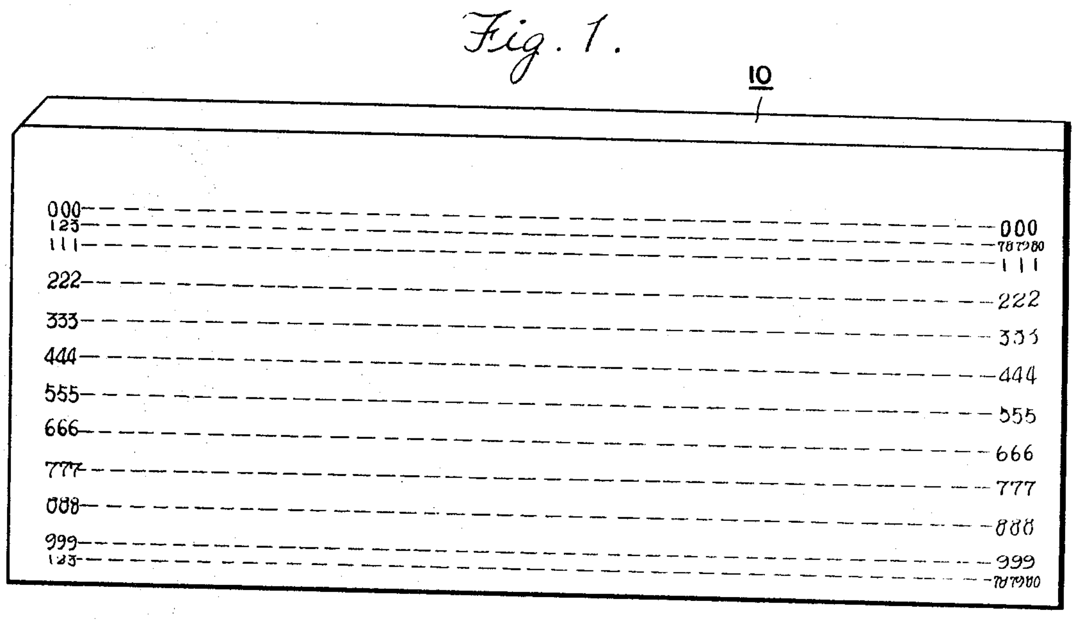
FIG. 1 is a plan view of one form of rate settling cards suitable for use with the present invention.

Referring now to FIG. 1 there is illustrated one type of cards suitable for use with the invention. The type of cards illustrated is identical to that commonly used with the standard computers utilized for general purposes. The invention will be described as using such cards to perform and record the operations of inspecting indications on the respective meters, computing the corresponding rates and receiving the latter.

As shown in FIG. 1, the card or record medium 10 has printed thereon 10 rows of digits 0, 1, 2, 3 ... 9 respectively in the named order, and starting with the upper side thereof as viewed in FIG. 1 for recording the informations in the form of perforations. Further two rows of digits consisting of a series of ordinal numbers starting with 0 and terminating at a predetermined number such as 80 between the two rows of digits 0 and 1 and beneath the row of digits 9 respectively.

For the purpose of the invention the 10 rows of digits are divided into a predetermined number in this example, 10 of columns for recording various informations as shown in FIG. 2. The card generally designated by the reference numeral 10 has a first or assortment number column 11 including a set of perforations identifying an assortment number of a name plate indicating the name of the particular customer and the like, a second or block column 12 having a set of perforations identifying a work block or district assigned to the particular operator for tasks such as inspecting of the associated meter, receipt of rates, etc. a third or last indication column 13 having a set of perforations indicating the last indication in KWH on a watt-hour meter, a fourth or customer column 14 having a set of perforations representative of the type of customers such as whether the customer is a large user or a small user, a fifth or assignation-of-payment column 15 having a set of perforations representing a way to pay a rate such as whether the rate will be paid directly or through a bank by the customer, a sixth or new indication column 16 in which an indication in KWH on the watt-hour meter now inspected is punched, a seventh or power column 17 in which a difference between the last and new indications or a consumption of power in KWH is punched, an eighth or rate column 18 in which a rate corresponding to the consumption of power is punched, a ninth or date column 19 in which a date on which the watt-hour meter was inspected is punched, and a 10th or receipt column 20 in which a code indicating whether or not the rate will have been payed is punched, in the named order and starting with the left-hand side of the card as viewed in FIG. 2. It is assumed that each column includes the 10 rows of digits consisting of the six same digits for the purpose of recording the informations in the form of numbers having at most six digits.

The card or record medium 10 further includes various printing areas on the upper marginal portion as viewed in FIG. 2. More specifically, a new indication printing area 21 is provided on the top of the new indication column 16 for printing a magnitude of the new indication on the watt-hour meter, a power printing area 22 is provided on the top of the power column 17 for printing a consumption of power, a rate printing area 23 is provided on the top of the rate column 18 for printing the rate, a date printing area 24 is provided on the top of the date column 19 for printing an inspection date and a receipt printing area 25 is provided on the top of the receipt column 20 for printing a symbol indicating whether or not the rate will have been paid.

It is noted that the first to fifth column inclusive have the respective sets of perforations preliminarily punched therein.

Referring now to FIG. 3, there is illustrated an application especially suitable for use with the card 10 as above-described in conjunction with FIGS. 1 and 2. Another record medium or application, generally designated by the reference numeral 26, is composed of one section of paper tape fed from a feed roll 27. Each application includes an assortment number area 11*a*, in which an assortment number corresponding to the punched assortment number in the column 11 of the card 10 is printed, a new indication area 21*a* in which digits corresponding to the punched number in the column 16 of the card are printed, a power area 22*a* in which digits corresponding to the punched number in the column 17, a rate area 23*a* in which a rate is printed, a date area 24*a* in which the inspection date is printed, and a receipt area 25*a* in which a seal as a proof that the rate has been paid is printed.

These areas 11*a* and 21*a* to 25*a* inclusive have a length substantially equal to the width of the corresponding column 16 to 20 inclusive. The tape has its rear face of the areas 21*a*—25*a* coated with carbon or any other suitable pressure sensitive colored material for copying purpose. As shown in FIG. 2, the tape is divided in sections by a perforated line 28.

In operation each application 26 can superpose or overlie a corresponding card 10 with both upper edges aligned with each other and with corresponding printing areas registered with each other as shown in FIG. 4*a*. Under these circumstances, the printing operation can be performed in the manner as will be described hereinafter.

Referring now to FIGS. 5, 6 and 7, there is illustrated a device for settling rates according to one aspect of the invention. The device generally designated by the reference numeral 30 has an elongated port 31 formed on one of the sidewalls, in this example, on the left-hand wall as viewed in FIG. 5 through which a card 10 such as shown in FIG. 2 can be inserted and removed in place into and from the interior, and a relative short exit slot 32 formed on the top wall or control panel thereof through which an application 26 as shown in FIGS. 3 and 4 can be taken off one after another after it has been printed as will be described in hereinafter. Provided on the opposed sidewall of the device 30 are a pair of handles 33 and 34 for effecting punching and printing operation and a printing operation respectively as will be fully described hereinafter.

Disposed on the top wall or control panel of the device 30 are REGISTER UNIT generally designated by the reference numeral 41, a plurality of pushbuttons 35, 36, 37 and 38, and a DISPLAY UNIT generally designated by the reference numeral 50. The pushbutton 35 serves to bring an inserted card and the associated application into their positions where a magnitude of indication of a watt-hour meter (not shown) set by the REGISTER UNIT 41 can be recorded in the new indication column and areas 16 and 21 and 21*a* respectively, and the pushbutton 36 serves to bring the card and application into their positions where a consumption of power can be recorded in the power column and areas 17 and 22 and 22*a*. The pushbutton 37 serves to bring the card and application to their positions where a rate can be recorded in the rate column and areas 18 and 23 and 23*a*, and the pushbutton 38 serves to bring the card and application to their positions where an inspection date can be recorded in the date column and areas 19 and 24 and 24*a*.

The REGISTER and DISPLAY UNITS comprise six components respectively for the purpose as previously described.

Further, the device 30 is provided on the control panel with a pushbutton 39 for printing on the application and card seals as a proof that the rate has been paid, and a switch 40 for a turning on and off a computer circuit as will be fully described hereinafter.

As best shown in FIG. 7 the device includes therein a CARD HOLDER UNIT generally designated by the reference numeral 55 for selectively advancing the record medium 10 to and through a plurality of different working positions in response to depression of the buttons 35—38. The CARD HOLDER UNIT movably supported on a support plate 56 (see FIG. 6). The UNIT 55 includes a compression spring 57 tending to bias it toward the entrance port 31 and is adapted to be moved by a FEED CARD UNIT 63 including the pushbutton 35 to 38 inclusive, through the action of the compression spring 57. The device 30 further includes a READOUT UNIT 65, disposed adjacent the entrance port 31, a PUNCHING AND PRINTING UNIT and RECEIPT SEAL UNIT generally designated by the reference numerals 70 and 92 respectively in FIGS. 6 and 7 and disposed in juxtaposed relationship and a COMPUTER UNIT generally designated by the reference 100 disposed on the bottom. The feed roll 27 is suitably disposed within the device 30 and its unrolled portion extends above the support plate 56 until it emerges from the exit slot 32 (see FIG. 6).

Figure 8B:
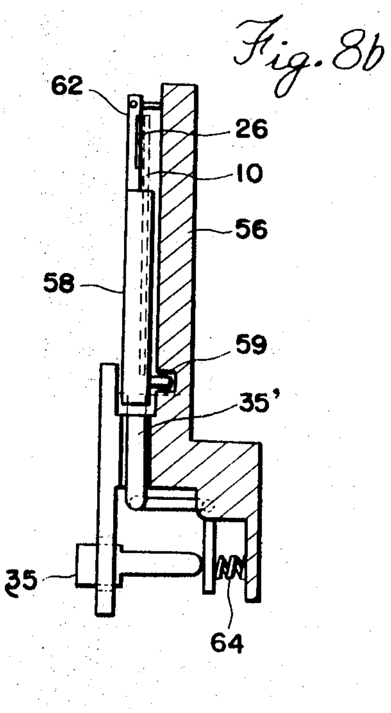

In FIG. 8, the CARD HOLDING UNIT 55 includes a card holding frame 58 of L-shape movably disposed on support plate 56 which, in turn, is provided on the lower portion as viewed in FIGS. 8*a* and *b* with a groove 59 for guiding the holding frame 58, a relatively shallow groove 60 for pushing an application against the support plate 56 and a relatively deep groove 61 disposed substantially in parallel and closely spaced relationship to the shallow groove 60 to push the application against the support plate 56 with the latter two communicating with each other at one end.

A frame 62 for pushing an application is arranged to interlock with the card holding frame 58 and to move in the left-hand direction as viewed in FIG. 8*a* through guiding by the deep groove 61 while maintaining the application 26 pushing against the corresponding card 10 by its own weight. The frame 62 is movable in the right-hand direction while being guided by the shallow groove 60 to permit the application to float above the card.

The indication pushbutton 35 is normally biased upwardly by the action of a spring 64 and includes a positioning rod 35′ adapted to leave the corresponding hole (not shown) formed on the card holding frame 58 upon depressing the button 35 against the action of the spring 64. The remaining pushbuttons 36, 37 and 38 are identical in construction to the pushbutton 35 and shown as including the respective positioning rods 36′, 37′ and 38′.

In operation the particular card 10 can be inserted from the entrance port 31 (see FIG. 5) in the right-hand direction as viewed in FIG. 8*a* into the device 30 to be fitted into a recess formed on the inside of the frame 58. The card 10 is then pushed in the right-hand direction against the action of the spring 57 until it reaches a working position, as illustrated in FIG. 8*a* where the positioning rod 35′ engages the said hole on the holding frame 58 whereby the card is held in that position. It is noted that upon inserting the card 10 into the device 30 the frame 62 for pushing the application 26 is moved along the shallow groove 60 to maintain the application floating above the card 10 whereby the application 26 is prevented from moving in either of both direction along with the card.

Then the indication pushbutton 35 can be depressed to remove the rod 35′, from the above-mentioned hole on the card holding frame 58 whereupon the card 10 is forced in the left-hand direction as viewed in FIG. 8*a* by the action of the spring 57 until the hole on the card holding frame 58 reaches beneath the positioning rod 36′ whereupon the rod is inserted into the said hole to hold the card 10 there. In this event it is noted that the frame 58 is guided by the deep groove 61 to push the associated application against the card by its own weight to permit the application to move in the left-hand direction together with the card.

If the rate and date pushbuttons 37 and 38 are successively depressed then both the card and application are successively stepped in the left-hand direction in the similar manner as above described.

Figure 9B:
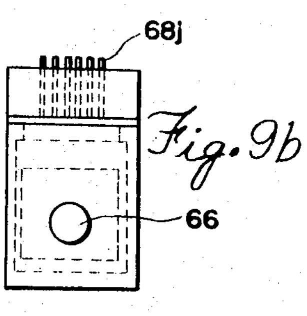

Referring now to FIG. 9 wherein (a) is a side elevational view and (b) is a front elevational view of a readout means comprising a CARD READOUT UNIT 65, it includes a source of light 66, a reflector mirror 67 for reflecting a beam of light from the source, and a plurality of photoelectric elements or photocells 68*a*, *b* *i* disposed in columns and rows to receive the beam of light reflected from the reflector. Each column includes 10 photocells as shown in FIG. 9*a* and each row includes six photocells as shown in FIG. 9*b*, for the purpose as previously described, disposed between the photocells 68 and slit 69 to intersect the optical paths leading to the photocells.

With the card 10 inserted into the slit 69 formed on the READOUT UNIT 65 from the front side of FIG. 9*a* to the rear side, the perforations on the card permit the beam of light from the source 66 to be transmitted therethrough to the photocells 68 whereby the photocells 68 provide the respective outputs whereby the information recorded on the card can be readout.

Figure 10B:
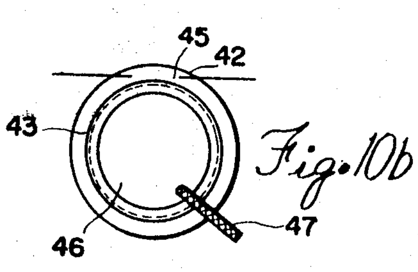

FIG. 10 illustrates the details of the REGISTER DIAL UNIT 41 for registering various informations such as a consumption of power, an inspection date, etc. into the device 30. The UNIT 41 comprises, in the illustrated example, six control discs 42 each having a character disc 43 coaxial and integral with the associated disc 43 and carrying the digits 0, 1, 9 on the peripheral wall. The sets of both discs are rotatably juxtaposed on a shaft 44 with the control discs 42 partially projecting beyond the respective windows 45 formed on the top wall of the device 30 in which the digits on the character discs 43 appear. Each of the character discs 43 has fixed on that side thereof opposite to the associated control disc 42 a rotary switch 46 to which a lead 47 is connected for the purpose as will be apparent hereinafter. The UNIT 41 is provided for the purpose of registering a consumption of power and an inspection date into the device.

The disc pair 42—43 may include 10 of the leads 47. Alternatively, a single lead may be used. A voltage dependent upon the particular digit set on the disc 43 may be provided through switching of the rotary switch 46. For example, the digit 1 provides 1 v. of voltage, the digit 2 provides 2 v. of voltage and so on.

FIG. 11 illustrates the details of the DIGITAL DISPLAY UNIT 50 as shown in FIG. 5. The UNIT 50 comprises six aligned digital display tubes 51-1, -2, -6 of conventional construction having the respective leads 52 connected thereto to display a decimal figure readout by the CARD READOUT UNIT 65. Referring now to FIG. 12 there is illustrated one form of PRINTING AND PUNCHING UNIT schematically designated at dotted block 70 in FIGS. 6 and 7. The UNIT 70 comprises six similar mechanisms, only one of which is shown in detail in FIG. 12, each mechanism comprising a variably settable recording means comprising a base clock 71 of U-shaped cross section, a pair of compression springs 72 and 73 disposed on the insides of both legs of the U and secured at one end to the base block 71 and a tilted support plate 74 supported by both springs 72 and 73 at the other or upper ends. The support plate 74 has rotatably mounted thereon on one end portion in this example on the left-hand end portion as viewed in FIG. 12*a*, ratchet wheel 75, a type drum 76 and a spur gear 79′ disposed coaxially and connected together into a unitary structure (see FIG. 12*b*). The gear 79′ meshes with a spur gear 78 rotatably supported by a support rod 79 planted on the support plate 74 which gear 78 has a coaxial roll 79′ integral therewith. The ratchet wheel 75 is adapted to be intermittently rotated by a pawl on the extremity of a type setting rod 80 capable of moving in the direction of the arrow upon energizing a relay 81 in the manner as will be described hereinafter.

The support plate 74 has also a pair of spaced small rollers 82 and 83 rotatably disposed thereon and an endless belt 84 spanned among the rollers 79′, 82 and 83 and having a punching hammer 85 fixed at a point on the external side of the belt.

Figure 12C:
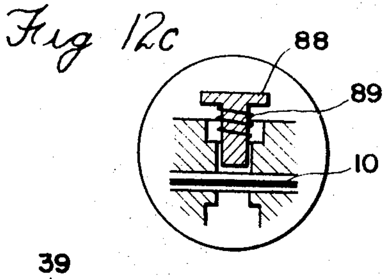

The base block 116 is provided on the bottom of the U with a slit 86 extending substantially in parallel to the bottom surface for the purpose of inserting the card thereinto and a plurality, in this example 10 of spaced stepped through holes 87 extending in their juxtaposed relationship and substantially perpendicularly to the slit. As best shown in FIG. 12*c*, one punch 88 is disposed in each hole 87 and is normally biased upwardly by an associated spring 89 so that its head projects from the upper end of the hole.

The base block 122 has rotatably and eccentrically mounted on the end portion of that U's leg near to the ratchet wheel 75 a printing eccentric cam 90 and also has rotatably and eccentrically mounted on the end portion of the other leg a punching and printing eccentric cam 91. The cam 90 is adapted to be rotated by the printing handle 34 to force the support plate 74 downwardly against the action of the spring 72 whereupon the type set on the type drum 76 is printed on both the application and card when positioned in the slit 86 through a printing ribbon (not shown). The cam 91 is adapted to be rotated by the punching and printing handle 33 to force the support plate 74 downwardly against the action of the spring 73 whereupon the hammer 85 strikes the selected one of the punches 88 to punch the card 10 while printing the corresponding type on the type drum 76 on the superposed application and card. Thus the handles 33 and 34 function to simultaneously record six figures on the application and card.

More specifically, the COMPUTER UNIT 100, as will be described later, applies to the relay 81 a train of pulses whose number corresponds to the value of the particular digit to be punched and printed in the manner as will be described hereinafter and each time the relay 81 receives one pulse, it is energized to pull the digit setting rod 80 in the direction of the arrow to step the ratchet wheel 75 in the counterclockwise direction as viewed in FIG. 12a by one tooth. Assuming that the type 0 initially faces the card and application, it will be appreciated that the ratchet wheel 75 is rotated through the number of teeth identical to the number of pulses in the train with the result that a desired type is ready for being recorded on the application and card through the recording operation.

On the other hand, the gears 77 and 78 and the rollers 79', 82 and 83 are rotated to move the belt 84 thereby displace the hammer 85 mounted on the belt directly above the selected one of the punches 88 corresponding to the number of applied pulses and hence to the value of the selected type on the drum.

Then the punching and printing handle 34 is operated to permit the hammer 85 to strike against that selected punch 88 in the manner as above-described through rotation of the cam 91 to punch the desired position of the card. At the same time the selected type on the type drum 75 is printed on the superposed application and card in the manner as above-described through rotation of the cam 90.

Alternatively the printing handle 34 may be operated only to print a selected one of the type on the type drum 75 upon the superposed application and card in the manner as above-described. It is noted that during this printing operation, the printing eccentric cam 90 is smaller in mass than the cam 91 which ensures that the hammer 85 is prevented from striking against one of the punches 88 during the printing operation.

Referring now to FIG. 13, there is illustrated one form of the RECEIPT SEALING UNIT schematically designated at dotted block 92. The unit 92 comprises a base block 93 of U-shaped cross section, a tilted support plate 94 pivotally mounted at one end to one leg, in this example the left-hand leg as viewed in FIG. 13 of the U and extending near the other leg, a compression spring 95 disposed between the support plate 94 and the upper surface of the U's bottom and serving to normally bias the support plate upwardly. The bottom of the U is provided with a slit and a stepped through hole substantially identical to the slit 86 and the hole 87 shown in FIG. 12 respectively with a punch 96 identical to the punch 88 as also shown in FIG. 12. A hammer 97 is mounted on the under side of the support plate 94 and in opposite apaced relationship with respect to the punch 96. The support plate 94 further has a seal 98 rigidly secured to the under side thereof and the receipt pushbutton 39 engaging the other end thereof.

With the superposed application and card positioned in the said slit from the front side to the rear side of the plane of FIG. 13, the pushbutton 39 can be depressed against the action of the spring 95 to move the support plate 94 downwardly whereupon the seal 98 is printed on the application and card while at the same time the card is properly punched by the punch 96 driven by the hammer 97.

Referring now to FIG. 14, there is illustrated one form of the COMPUTER UNIT schematically designated at dotted block 100 in FIGS. 6 and 7. The UNIT 100 illustrated comprises three AND gates 101, 102 and 103 each having one input fed by the READOUT UNIT 65 and an AND gate 104 having one input connected to the output of the AND gate 101 and an output connected to the DISPLAY UNIT 50. The output of the AND gate 101 is further connected to the relay 81 (see FIG. 12a), and the AND gates 102 and 103 have the respective outputs connected to electric circuit means comprising a first computer circuit 105 for computing a consumption of the power and a second computer circuit 106 for computing a rate or charge. The first computer circuit 105 is fed from an AND gate 107 connected to the REGISTER DIAL UNIT 41 and has an output connected to the second computer circuit 106 and also to one input of an AND gate 108. All the AND gates have the other outputs adapted to be applied with a gating pulse as will be described hereinafter. The outputs of the AND gates 101, and 108 and the second computer circuit 106 are connected together and also connected to the output of the AND gate 107.

It is assumed that one card 10 for the particular customer has been inserted through the entrance port 31 (FIG. 5) in the interior of the device 30 where it is held at its position as illustrated in FIG. 8a. It is also assumed that one application 26 composed of one section of the tape from the supply roll 27 superposes the card 10 in the manner as shown in FIGS. 4a, 6, 7 and 8. Under these assumed conditions, the superposed application and card are in their positions as illustrated at horizontal solid line in FIG. 4b, row A where the assortment number column 11 on the card 10 faces the READOUT UNIT 65 while the assortment number area 11a on the application 26 faces the PUNCHING AND PRINTING UNIT 70.

Under these circumstances, the source switch 40 (see FIG. 6) is turned on to provide a gating pulse $G_1$ (see FIG. 15) from a source of electric energy (not shown) which is, in turn, applied to the AND gates 101 and 104. While the gating signal $G_1$ is present at the one input of each gate 101 and 104, the output signal from the READOUT UNIT 65 passes through both gates to the DISPLAY UNIT 50 to actuate same whereupon the DISPLAY UNIT which, in turn, indicates an assortment number identical to that recorded in the column 11 on the card 10. The output signal from the READOUT UNIT 65 is also applied through the gate 101 to the relay 81 which sets the value of type on the type drum 75 to equal the assortment number in response to this output signal.

After having checked that the assortment number displayed by the DISPLAY UNIT 50 is identical to that for the customer or that recorded in the card 10, the operator or inspector operates the printing handle 34 to print the assortment number in the assortment number area 11a on the application.

Then he sets the REGISTER DIAL UNIT 41 to a magnitude of indication on the associated watt-hour meter followed by depression of the new indication pushbutton 35. This causes the superposed application and card to move to their next working positions in the manner as previously described in conjunction with FIG. 8 where the work block column 13 on the card 10 faces the READOUT UNIT 65 while the new indication column and areas 16 and 21 and 21a respectively of the card and application face the PUNCHING AND PRINTING UNIT 70 as shown in FIG. 4b, row B. At the instant the pushbutton 35 is depressed, a gating signal $G_1$, $G_2$ (see FIG. 15) is produced and the digits set by the REGISTER DIAL UNIT 41 are indicated by the DISPLAY UNIT 50 through the AND gates 107 and 104 having now the gating signal $G_2$ at the other inputs while they are applied to the relay 81 and the first computer circuit 105 wherein it is temporarily stored.

After having checked that both sets of digits on the DISPLAY UNIT 50 and the watt-hour meter are identical to each other, the inspector operates the punching and printing hand 33 to punch the magnitude of new indication just inspected in the new indication column 16 on the card 10 and simultaneously print it in the new indication area 21a and 21 on the application and card in the manner as previously described in conjunction with FIG. 12.

Then the power pushbutton 36 is depressed to move both sheets or the card and application to their positions as illustrated in FIG. 4b, row C where the last indication card column 13 faces the READOUT UNIT 65 while the power column and areas, 18 and 22, 22a to both sheets face the PUNCHING AND PRINTING UNIT 70.

Under these circumstances, the depression of the power pushbutton 36 also causes a gating signal $G_3$ (see FIG. 15) which is, in turn, applied to the AND gates 102, 104 and 108. Therefore a signal representative of the amount of power lastly consumed as readout from the READOUT UNIT 65 is applied through the AND gate 102 to the first computer circuit 105 which provides a difference signal representative of the difference between the consumption of power now applied thereto and of that previously stored therein. This difference signal represents the amount of power consumed between the last meter reading and the present meter reading and is supplied to the second computer circuit 106 where it is stored and also through the AND gates 108 and 104 to the DISPLAY UNIT 50 which, in turn, visually displays that difference between power consumptions as well as being applied to the relay 81 through the AND gate 108 to set the type drum 75 to the magnitude of that consumption differential and simultaneously dispose relative to the hammer 85 just above the corresponding punch 88 in the manner as previously described.

Then the inspector operates the punching and printing handle 33 to effect punching and printing in the corresponding column and area 17 and 21, 21*a* on both sheets in the similar manner.

Then the pushbutton 37 is depressed to move both sheets until they assume their positions as illustrated in FIG. 4*b*, row D where the customer column 14 on the card 10 faces the READOUT UNIT 65 while the rate column and areas 18, and 23 and 23*a* on both sheets face the PUNCHING AND PRINTING UNIT 70.

The depression of the pushbutton 37 also causes a gating signal $G_4$ (see FIG. 15) which is, in turn, applied to the AND gate 103. Therefore the output signal from the READOUT UNIT 65 is applied to the rate computer circuit 106 through the gate 103. Then the rate computer circuit 106 computes a rate by multiplying the consumption of power previously stored therein by a factor determined by the information now provided by the READOUT UNIT 65 and supplies output pulses in the form of a rate signal corresponding to that rate to the relay 81 and also to the DISPLAY UNIT 50 through the AND gate 104.

The inspector can now operate the punching and printing handle 33 to punch and print the rate in the rate column and area 18 and 23 and 23*a'* on both sheets. The REGISTER DIAL UNIT 41 is then set to the particular inspection date and the date pushbutton 38 is depressed to bring both sheets 10 and 26 into their positions where the assignation-of-payment column 17 on the card 10 faces the READOUT UNIT 65 while the date column and area 17 and 24 and 24*a'* on both sheets face the PUNCHING AND PRINTING UNIT 70 as shown in FIG. 4*b*, row E.

As depression of the pushbutton 38 also causes a gating signal $G_5$ (see FIG. 15), the date set on the REGISTER DIAL UNIT 41 is supplied to the relay 81 through the AND gate 107 having the gating signal $G_5$ applied to its other input resulting in both setting of the type drum 125 and adjusting of the position of the hammer 85. Under these circumstances, it is noted that the DISPLAY UNIT 50 continuous to display the rate.

The handle 33 is operated to punch the date in the date card column 19 on the card and simultaneously to print it on the date areas 25 and 25*a* on both sheets. Thereafter the inspector can claim the rate displayed by the DISPLAY UNIT 50 to the associated customer.

If he has received the rate, then it is required only to depress the receipt pushbutton 39 to punch a seal in the receipt card column 20 while at the same time printing seals in the receipt areas 25 and 25*a* on both sheets as a proof that the rate has been payed. This is possible because the RECEIPT SEALING UNIT 92 is disposed adjacent the PUNCHING AND PRINTING UNIT 70 as shown in FIGS. 4*b*, 6 and 7. Then the card 10 can be removed from the device 30 through the slot 31 and the application thus prepared is pulled out from the device 30 through the outlet slot 34 and cut away from the remaining portion of the tape along a perforated line 28 first emerging.

If the rate is not payed, the depression of the receipt pushbutton 38 is not effected followed by cutting of the application in the manner as above described.

The procedure as above-described is repeated with the next card.

The practice of the other aspect of the invention will now be described in conjunction with FIG. 16. In FIG. 16, the invention comprises a watt-hour meter 201 equipped on each customer, means 202 for providing informations concerning the type of customer such as whether the customer is a large user or small user, an indication on the watt-hour meter lastly inspected, etc. and a portable rate setting device 203 such as previously described.

An inspector carrying the device 203 first read an indication on the watt-hour meter 201 and can manually store it in the device 203 as designated by the arrow A. Alternatively the watt-hour meter 201 may be electrically or mechanically coupled to the device 203 to automatically store the indication on the watt-hour meter 201 into the device 203.

As shown by the arrow B, the informations stored in the information providing means 202 are supplied to the device 203 by cards a tape or the like having punched or printed thereon such informations. The device 202 utilizes those informations and the indication A on the Watt-hour meter 201 now inspected to compute a consumption of power and corresponding rate between the last and now inspection days in the manner as previously described.

The device 203 is arranged to record and display the results of the computation whereby the inspector is able to the associated customer 204 thereby to know him a consumption of electric power and to call upon him to the rate.

If possible the inspector will receive the rate from that customer.

When the rate D has been payed, the device 203 is utilized as an accounting machine to perform the receiving operation thereby to give a receipt E. Alternatively if the rate is not payed, the operations involving up to the issue of the application will be performed and the rate is required to be payed later on.

In addition to the operations as above described, the device 203 serves to record the results of such operations on individual record media 205 for use with the operation of setting rates, by means of punching, printing process or the like as shown by the arrow F.

Furthermore the device computes variously reduced rates. For example, the information providing means 202 may have stored therein discount rates due to early payments and a factor less than unity by which the normal charge is multiplied may vary in accordance with a date on which the charge is payed. Then device 203 utilizes the factor to settle a charge for early payment.

The invention may also be practiced in the manner as shown in FIG. 17. In FIG. 17 a set of rate setting cards 301 similar to the card 10 as shown in FIGS. 1, and 2 and 4*a* are supplied to a rate setting device 302 such as the device 30 as previously described, one after another, as shown by the arrow A. The device 302 is supplied with the information B resulting from a watt-hour meter 303 of each customer 304. The device 302 issues to the customer an application prepared on the basis of the information as shown by the arrow C, receives the rate as shown by the arrow labeled "RATE" and issues a receipt to him as shown by the arrow D in the manner as previously described. However, in this example, the cards 301 are preferably delivered from the device 302 one after another, as rate setting cards 305 having perforations or prints thereon. The processed cards 305 are successively fed into a data processing apparatus 306 for processing the cards 305. The rate settled by the device 302 is transferred from the apparatus 306 to a bank 307 with which the particular customer has an account as shown by the dotted arrow G. The rates will be payed by the bank 307 as shown by the dotted arrow labeled "RATE." Alternatively it may be payed by the customer as shown by the dotted arrow H. The apparatus 306 provides data I to a record ledger 308 suitable for use in forming the statistical data and also preparing a new set of cards 309 for use in the succeeding operation of settling rates.

In the arrangement shown in FIG. 17, each inspector making the round of his assigned block performs the operations of computing a rate, giving an application and a receipt for each of the customers 304 and preparing the cards 305 processed for the purpose of setting the rates, whereas the succeeding totaling and registering operations and the like are performed by the larged-sized data processing apparatus 306.

More specifically, each inspector making the round of his assigned block has initially delivered to him a set of card 301 as shown in FIG. 18. Each card 301 has column *a* in which an assortment number and/or symbol is printed or punched to identify the particular customer, a column *b* in which an assortment number and/or symbol is printed to identify a block to which the customer belongs, a column *c* in which the type of customers such as whether the customer is a large user or a small user is punched or printed, a column *d* in which the last indication on the associated Watt-hour meter is punched or printed, a column *e* in which a new indication on the meter is punched or printed, a column *f* having punched or printed therein an inspection date, a column *g* having punched or printed therein a consumption of power, a column *h* having punched or printed therein a rate, a column *i* having punched or printed therein whether or not the payment is made through a bank by the customer, a column *j* having punched or printed therein a date at which the rate has been payed, a column *k* having punched or printed therein whether or not an application has been issued, and a column *l* having punched or printed therein whether or not a receipt has been given, in the named order starting with the left-hand side as viewed in FIG. 18. Further, the card 301 includes on the right-hand end portion as viewed in FIG. 18, an application (A) and a receipt (B) capable of being cut away from the card along the respective perforated lines.

It is assumed that the cards 301 delivered to each inspector has the required data punched or printed in the columns *a*, *b*, *c*, *d* and *i*. Those cards are used as the input and output cards for both the rate setting device and the data processing apparatus 302 and 306. When the inspector visits the particular customer 304, the corresponding card 301 is inserted into his device 302.

Then the inspector reads an indication on the associated watt-hour meter 303 and register it in the device 302 while he punches or prints the new indication and an inspection date in the columns *e* and *f* respectively.

Thereafter he obtains a consumption of power from the last indication recorded in the column *d* and the new indication and punches or prints the consumption of power in the column *g* on the card 301. Then he computes a rate in accordance with the item in the column *c* followed by punching or printing of the rate in the column *h* and on the application (A). The application (A) is cut away from the card 301 and given the customer 304.

If the rate has been payed by the customer 303 as a result of the application (A) being given then the inspector uses the device 302 to perform the operation of receiving the rate. That is, he punches or prints the required items in the column *i* while punching or printing the required items on the receipt (B) on the card 301. Then the receipt (B) is cut away from the card 301 and given the customer 304. However, the operation at that stage are eliminated provided that the rate can not be payed or that the customer pays the rate through the bank. In this case, the columns *j*, *k* and *l* on the card 301 have been printed or punched therein a date at which the rate is payed, whether or not the application was given, and whether or not the receipt was given, respectively.

Then the cards 305 having the perforations or prints in the columns *a* to *l* inclusive are collected and used as input cards to the data processing apparatus 306 which, in turn, performs the following operations.

1. The processed cards 305 are readout to check whether or not the devices 302 will have erroneously collected the rates.

2. If the devices 302 made mistakes or if a rate has not yet be payed by a customer who does not pay the rate through a bank, then a money collector is caused to go to such a customer.

3. With the particular customer 304 having an account with a bank, his rate is transferred to that bank 307 from which the rate is received.

4. The concepts of the cards 305 after having been subject to the readout operation are regulated, totaled and then recorded in a record ledger as statistical data.

5. Then the new cards 309 are prepared having punched or printed in the columns *a*, *b*, *c*, *d* and *i* the required items and ready for the succeeding operation of settling the rates.

The invention has several advantages. For example, the operations of inspecting the watt-hour meter and collecting the rates which are at present separately performed can be simultaneously performed by the respective inspectors at the time when they inspect the watt-hour meters such that they use the rate setting devices as previously described to compute the respective rates and issue the applications and if possible, to collect the rates and give the receipts. Thereafter the data processing apparatus is used to process the data on the cards.

While the invention has been illustrated and described with reference to certain preferred embodiment thereof it is to be understood that various changes and modifications may be resorted to without departing from the spirit and scope of the invention.

We claim:

1. An apparatus for determining the amount of a product consumed between two time periods comprising: a record medium having recorded thereon information representative of the amount of a product consumed as of a predetermined time period; selectively actuated advancing means for progressively advancing said record medium through a plurality of working positions; readout means operative when said record medium is in a first working position for reading said information recorded on said record medium and developing a corresponding output signal; variably settable recording means manually operative when said record medium is in a second working position for recording on said record medium additional information representative of the amount of said product consumed as of a time period subsequent to said predetermined time period and developing another corresponding output signal; circuit means receptive of both said output signals for developing a difference signal representative of the amount of said product consumed between said two time periods; and reset means responsive to said difference signal for resetting said recording means to a condition to record on said record medium information representative of the amount of said product consumed between said two time periods.

2. An apparatus according to claim 1; further including display means responsive to said difference signal for visually displaying the amount of said product consumed between said two time periods.

3. An apparatus according to claim 1; further comprising rate-computing circuit means receptive of said difference signal for computing the rate of said product consumed between said two time periods and developing a corresponding rate signal in response to actuation of said advancing means to effect advancement of said record medium to a third working position; and means including said reset means responsive to said rate signal for resetting said recording means to a condition to record information representative of said rate.

4. An apparatus according to claim 3; further including display means responsive to said rate signal for visually displaying the rate of said product consumed between said two time periods.

5. An apparatus according to claim 1; wherein said readout means comprises a plurality of photoelectric elements responsive to light rays passing through said record medium to develop said first-mentioned output signal, and a source of light disposed to emit light rays towards said photoelectric elements.

6. An apparatus according to claim 1; wherein said circuit means comprises an electric computer circuit receptive of both said output signals to compute said difference signal, first gating means actuated in response to the actuation of said advancing means to effect advancement of said record medium to said first working position for gating said first-mentioned output signal to said electric computer circuit, and second gating means actuated in response to the actuation of said advancing means to effect advancement of said record medium to said second working position for gating said second-mentioned output signal to said electric computer circuit.

7. An apparatus according to claim 1; further including another record medium; means for releasably holding said another record medium in overlying relationship with a portion of said first-mentioned record medium during advancement of same through said working positions; and variably settable printing means manually operative when said first-mentioned record medium is in said second working position for printing of both said record mediums information representative of the amount of said product consumed between said two time periods.

8. An apparatus according to claim 7; further comprising means operative in synchronism with said reset means for resetting said variable settable printing means.

9. A device for determining rates for consumptions of a quantity, comprising: a set of record media having recorded thereon a magnitude of indication on a meter for integrating a consumption of the quantity obtained at the last inspection of the meter; readout means for reading out the record medium to provide a corresponding output signal; means for registering on said record medium a magnitude of indication on the meter obtained at the new inspection of the meter; first computer circuit means connected to both said readout means and said register means to compute a difference between said output signal from said readout means and said magnitude of indication registered by said register means to provide a difference signal output indicative of the consumption of the quantity; second computer circuit means responsive to said difference signal applied thereby to said first computer circuit means to compute the corresponding rate and provide a corresponding rate signal output; recording means for simultaneously recording the outputs from said first and second circuit means on said record medium and another record medium in superposed relationship; and another recording means for recording said output on a record medium from the group consisting of the first-mentioned record medium and said another record medium.

10. A device for determining rates for consumptions of a quantity, comprising: a set of record media having recorded thereon a magnitude of indication on a meter for integrating a consumption of the quantity obtained at the last inspection of the meter; readout means for reading out the record medium to provide a corresponding output signal; means for registering on said record medium a magnitude of indication on the meter obtained at the new inspection of the meter; first computer circuit means connected to both said readout means and said register means to compute a difference between said output signal from said readout means and said magnitude of indication registered by said register means to provide a difference signal output indicative of the consumption of the quantity; second computer circuit means responsive to said difference signal applied thereto by said first computer circuit means to compute the corresponding rate and provide a corresponding rate signal output; recording means for recording the outputs from said first and second circuit means on a record medium selected from the group consisting of said record medium and another record medium; another recording means for recording on both said selected record medium and a receipt a seal as a proof that the rate has been received; holding means normally biassed in a predetermined direction by spring means to hold the said record medium; means for positioning said record medium; and feed means responsive to the operation of said positioning means to feed said record medium to its recording position through said holding means.

11. A device for determining rates for consumptions of a quantity, comprising: a set of record media having punched thereon a magnitude of indication on a meter for integrating a consumption of the quantity obtained at the last inspection of the meter; readout means for reading out the record medium to provide a corresponding output signal, said readout means including a plurality of photoelectric elements seeing the record medium a source of light, and a signal reflecting mirror for directing a ray of light from said source to said photoelectric elements through the record medium; means for registering on said record medium a magnitude of indication on the meter obtained at the new inspection of the meter; a rotary switch operatively coupled to said registering means; first computer circuit means connected to both said readout means and said registered means to compute a difference between the said output from said readout means and said magnitude of indication registered by said register means and supplied through said rotary switch to provide a consumption of the quantity; and second computer circuit means responsive to said consumption of the quantity applied thereto by said first computer circuit means to compute the corresponding rate.